(12) United States Patent
Vonikakis et al.

(10) Patent No.: US 11,188,212 B2
(45) Date of Patent: Nov. 30, 2021

(54) METHODS AND SYSTEMS FOR MONITORING OBJECTS FOR IMAGE-INSPECTION

(71) Applicant: PANASONIC INTELLECTUAL PROPERTY MANAGEMENT CO., LTD., Osaka (JP)

(72) Inventors: Vasileios Vonikakis, Singapore (SG); Yao Zhou, Singapore (SG); Chandra Suwandi Wijaya, Singapore (SG); Ariel Beck, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 22 days.

(21) Appl. No.: 16/824,467

(22) Filed: Mar. 19, 2020

(65) Prior Publication Data
US 2021/0294488 A1    Sep. 23, 2021

(51) Int. Cl.
*G06F 3/00* (2006.01)
*G06F 3/0484* (2013.01)
(Continued)

(52) U.S. Cl.
CPC ...... *G06F 3/04847* (2013.01); *G06F 3/04845* (2013.01); *G06T 7/0004* (2013.01); *G06F 2203/04803* (2013.01); *G06T 2200/24* (2013.01); *G06T 2207/20076* (2013.01); *G06T 2207/20081* (2013.01); *G06T 2207/20092* (2013.01)

(58) Field of Classification Search
None
See application file for complete search history.

(56) References Cited

U.S. PATENT DOCUMENTS

| | | | | |
|---|---|---|---|---|
| 2005/0210388 A1* | 9/2005 | Matsumoto | ........ | H04N 21/4316 715/719 |
| 2007/0104374 A1* | 5/2007 | Terakawa | .......... | G06K 9/00248 382/190 |

(Continued)

FOREIGN PATENT DOCUMENTS

| EP | 0 930 499 A1 | 7/1999 |
|---|---|---|
| WO | 99/14706 A2 | 3/1999 |

*Primary Examiner* — Toan H Vu
(74) *Attorney, Agent, or Firm* — McDermott Will and Emery LLP

(57) ABSTRACT

A method implemented in a computing-device with a display screen for image inspection. The method comprises displaying a distribution of a quality-indicia of at least one object in each of a plurality of images to be inspected, within a first area of the display screen. Within a second area of the display screen, a user-control is displayed to adjust a threshold-value with respect to an acceptance of at least one object in said plurality of images to be inspected. The threshold-value may be determined manually or automatically. A change in or update of threshold value is determined based on a user-operation performed over the user-control for adjusting the threshold value. Thereafter, a quality-indicia of at least one object in each the plurality of images is determined. Acceptable objects in respect of an image inspection procedure based on the updated threshold value and the determined quality-indicia are indicated.

11 Claims, 8 Drawing Sheets

(51) Int. Cl.
  *G06T 7/00*   (2017.01)
  *G06F 3/01*   (2006.01)

(56)  References Cited

U.S. PATENT DOCUMENTS

| | | | |
|---|---|---|---|
| 2011/0187653 A1* | 8/2011 | Ko | G06F 3/0412 |
| | | | 345/173 |
| 2012/0081540 A1 | 4/2012 | Jang | |
| 2014/0096071 A1* | 4/2014 | Tomita | G06F 3/04883 |
| | | | 715/784 |
| 2014/0343428 A1* | 11/2014 | Tanaka | G01S 7/52074 |
| | | | 600/440 |
| 2015/0160895 A1* | 6/2015 | Mizuno | H04N 1/00 |
| | | | 358/1.15 |
| 2016/0070402 A1* | 3/2016 | Kim | G06F 3/04817 |
| | | | 345/173 |
| 2017/0277410 A1* | 9/2017 | Honjo | H04N 1/00411 |
| 2017/0285905 A1* | 10/2017 | Sato | G06F 3/0482 |
| 2019/0096093 A1* | 3/2019 | Shinoda | G06T 11/001 |
| 2020/0388205 A1* | 12/2020 | Bae | G09G 3/2003 |

\* cited by examiner

METHODS AND SYSTEMS FOR MONITORING OBJECTS FOR IMAGE-INSPECTION

TECHNICAL FIELD

The present invention relates to image-inspection and in particular relates to quality-control of objects.

BACKGROUND

Computerized visual-inspection of objects through their images as a part of industrial quality control process have been into existence for some time. Objects are usually classified as "Good/OK" or "Not Good/NG" based on calculated probabilities of their approval and rejection by an artificial intelligence or machine learning based approaches applied upon the images of the objects. An image processing criteria scans the image under consideration, identifies the objects, aligns the object in the image frame and thereafter calculates the probability of the acceptance or rejection of the object during a forthcoming image inspection/quality-control process.

In Machine learning (ML) classification, one of the common classifier is probabilistic classifier. A probabilistic classifier is a classifier that is able to predict, given an observation of an input, a probability distribution over a set of classes, rather than only outputting the most likely class that the observation should belong to. An example distribution of probabilities range from 0.0 to 0.9, 0 to 99%, a scale from 0 to 9, a grade from 1 to 5, etc.

However, simply alerting OK, non-OK, accepted, rejected for the objects often falls short of expectation since in real life situation there are always boundary cases and prevalence of ambiguity. What may be comfortably acceptable to industry A may be entirely non-acceptable to industry B. Accordingly, one has to usually resort to industry specific evaluation or classification through employing dedicated procedures for different industries.

Accordingly, the classification criteria employed by one industry is usually found useless for other, since the classification done by one industry is rigid due to a fixed threshold or rigid decision boundary.

There lies at least a need for a control that allows an ease of relaxation of the decision boundary for a classification criteria employed in one industry (or class of products) for rendering said classification criteria usable for another industry or class of products as well.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for predicting a condition of living-being in an environment.

In accordance with some example embodiments of the inventive concepts, the present subject matter describes a graphical user interface (GUI) for enabling image inspection on an electronic device equipped with an input-device and a display-screen. The GUI comprises a first area of display-screen configured to display a distribution of a quality-indicia of at least one object in each a plurality of images to be inspected. A second-area of display-screen configured to display a user-control to adjust a threshold value with respect to an acceptance of said at least one object in the plurality of images to be inspected, said threshold value configured to be determined manually or automatically.

In accordance with other example embodiments of the inventive concepts, the present subject matter describes a method implemented in a computing-device with a display screen for image inspection. The method comprises displaying, in a first area of the display screen, a distribution of quality-indicia of at least one object in each of a plurality of images to be inspected. In a second-area of the display screen, a user-control is displayed to adjust a threshold value with respect to an acceptance of at least one object in said plurality of images to be inspected. An updated-threshold value is determined based on a user-operation performed over the user-control for adjusting the threshold value. A quality-indicia of at least one object is determined in each of the plurality of images. Accordingly, the objects as deemed acceptable are indicated in respect of an image inspection procedure based on the updated threshold value and the determined quality-indicia.

The objects and advantages of the embodiments will be realized and achieved at-least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

Figure 1:
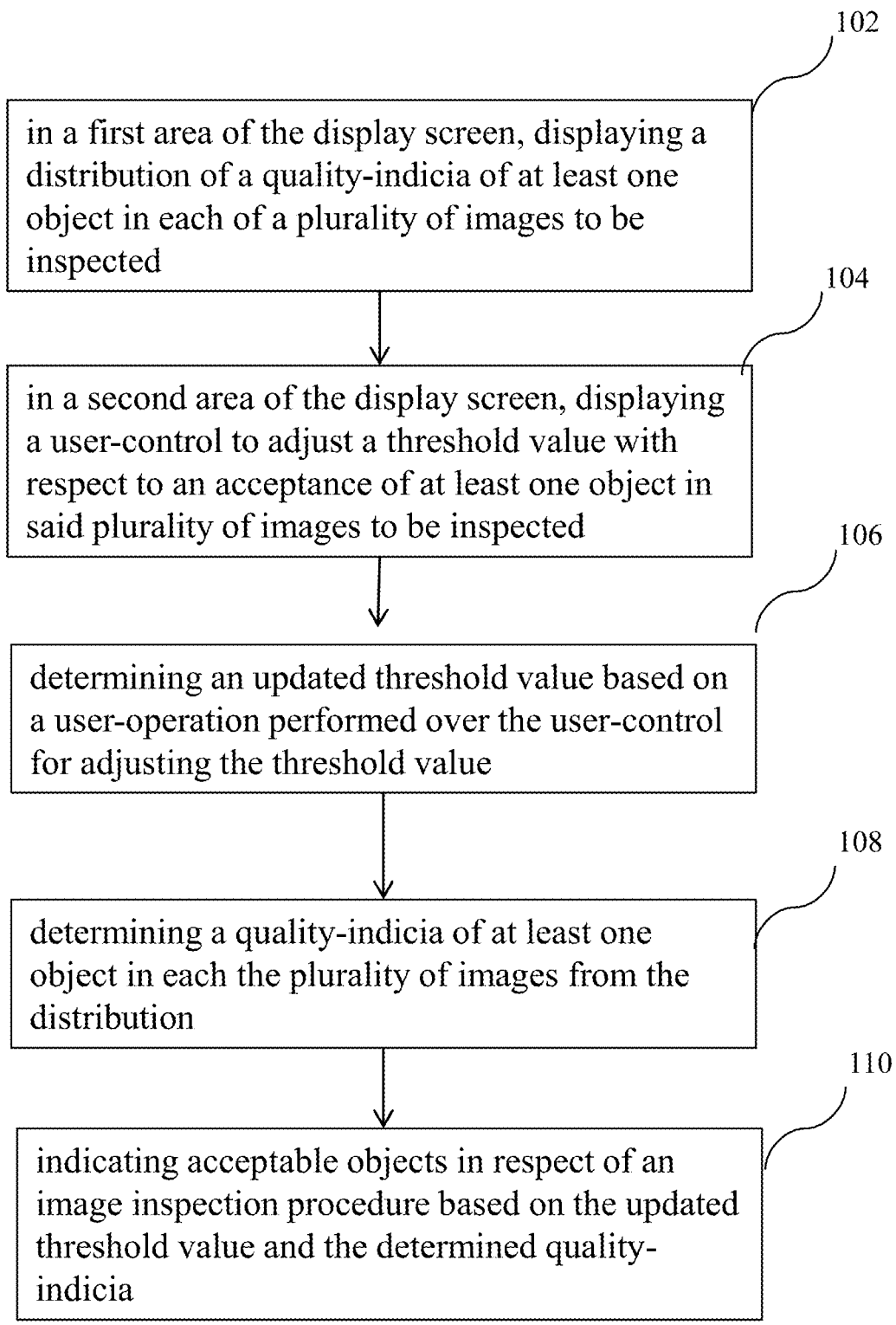
FIG. 1 illustrates a method for assisting image-inspection in a computing-device, in accordance with the embodiment of the present disclosure.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present subject matter are described below in detail with reference to the accompanying drawings.

FIG. 1 illustrates a method implemented in a computing-device with a display screen for assisting image inspection. The method comprises displaying (102), in a first area of the display screen, a distribution of quality-indicia of at least one object in each of a plurality of images to be inspected. The quality-indicia corresponds to a probability of the acceptance and/or rejection of said at least one object within the plurality of images. Such quality-indicia may be set by default by a machine-learning model based on the images to be inspected. In an example, the distribution is a histogram based representation of the computed-indices pertaining to each of a plurality of images, wherein the probability of acceptance represents the probability of the said at-least one object within image being satisfactory or unsatisfactory.

In a second-area of the display screen, the method comprises displaying (104) a user-control to adjust a threshold-value with respect to an acceptance of at least one object in said plurality of images to be inspected. The threshold-value or the decision-boundary may be changed by the user by a magnitude that is either determined manually or may be automatically computed (e.g. by Otsu's methods).

Further, the method comprises determining or ascertaining (step 106) an updated/altered threshold value based on a user-operation performed over the user-control for adjusting the threshold-value. In an implementation, the adjusting of the threshold value is defined by a decrement of the threshold value for minimizing erroneous object-rejection during the image inspection procedure, or in other words, for a deceased sensitivity towards the object during the image inspection procedure.

In other implementation, the adjusting of the threshold value is defined by an increment of the threshold value for minimizing erroneous object-acceptance during the image inspection procedure, or in other words, for an increased sensitivity towards the object during the image inspection procedure.

Further, the method comprises determining (step 108) a quality-indicia of at-least one object in each the plurality of images. The same may be accessed from the distribution of quality indicia as displayed in the first portion of the screen.

Accordingly, the method comprises (step 110) determining indicating acceptable-objects or an altered categorization of objects based on the updated threshold value and the determined quality-indicia. Such indication may be in the form of a changed classification of objects. In an example, the object categorized by the preset threshold as OK may be deemed NG by the altered threshold.

Figure 2:
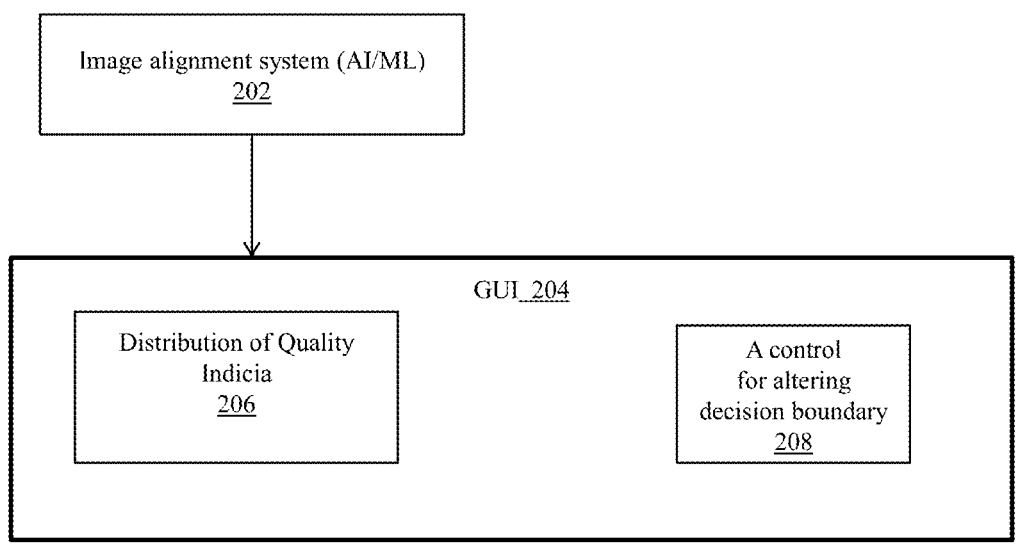
FIG. 2 illustrates a schematic-architecture for assisting image-inspection in a computing-device, in accordance with an embodiment of the present disclosure.

FIG. 2 illustrates a schematic-architecture 200 comprising a machine-learning or AI based image alignment system 202 and a graphical user interface (GUI) 204 for enabling image inspection on an electronic device provided with an input-device and a display-screen.

The image-alignment system 202 may be a state of the art module such as SPCAP, PECGI, PICN etc for aligning an object (detected in the image) within image frame as per industrial standards to thereby propagate the object for quality-control through aid of image inspection process. The alignment system 202 may be accordingly configured to execute the method steps 102 and thereby generate a distribution of quality-indicia with respect to the aligned objects. An example-distribution has been depicted in FIG. 4

The GUI 204 renders a display 206 of the generated distribution of the quality-indicia with respect to aligned objects in the image frame and accordingly executes the method steps 102. Further, GUI 204 renders a control 208 for changing the decision-boundary as associated with the generated-distribution. Accordingly, the GUI 204 in association with the processing module of the underlying computing environment is configured to execute the rest of the method steps 104 till 108.

Figure 3A:
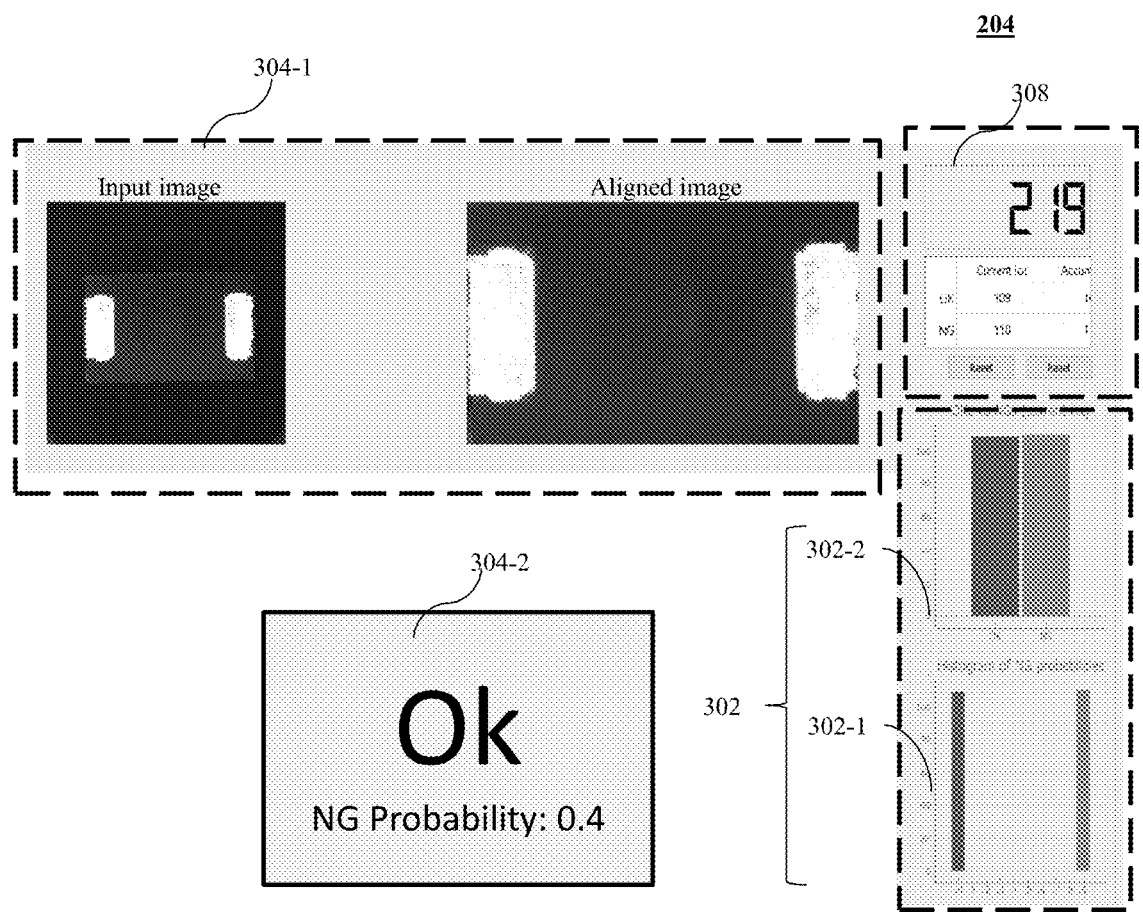
FIGS. 3A and 3B illustrate a graphical user interface (GUI) for assisting image-inspection and quality-control, in accordance with another embodiment of the present disclosure.
Figure 3B:
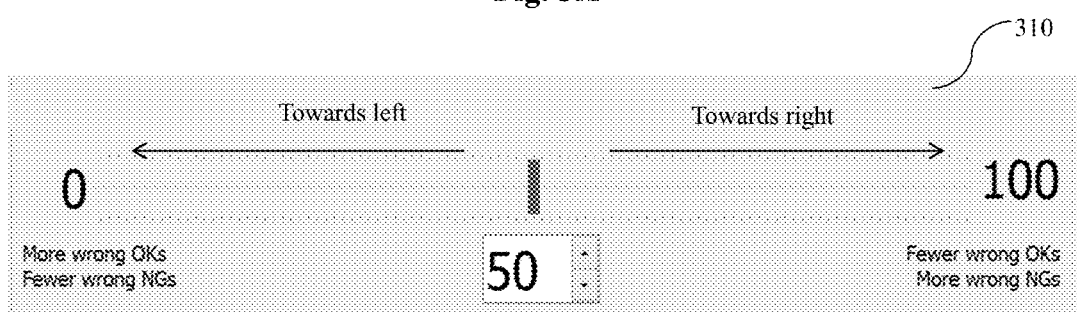

FIGS. 3A and 3B illustrates a graphical user interface (GUI) for assisting image-inspection and quality-control, in accordance with another embodiment of the present disclosure.

The GUI 204 comprises a first-area 302 (as shown in FIG. 3A) of display-screen configured to display a distribution of a quality-indicia of at-least one object in each a plurality of images to be inspected. The quality-indicia corresponds to a probability of the acceptance and/or rejection of said at least one object within the plurality of images and is computed by the image alignment system 202. The distribution is a histogram based representation of the computed indices pertaining to each of a plurality of images, wherein the probability of acceptance represents the probability of the said at least one object within image being satisfactory or unsatisfactory.

The GUI 204 comprises the second-area 310 (as shown in FIG. 3B) that is configured to display a second-area of display-screen to display a user-control to adjust a pre-determined threshold value or a preset decision boundary with respect to an acceptance of said at least one object in the plurality of images to be inspected. The fresh threshold value may be determined by the user intuitively or automatically (for example based on Otsu' method.

The control in 310 may be a linearly movable graphical button for enabling the user to adjust or change the preset threshold-value (which is preset as 50 as indicated in figure) for acceptance of said at least one object within the plurality of images to be inspected. The user-selected position of movable-button renders the threshold value on the scale of 100. The movement of the graphical button in 310 is defined by a leftward movement for decreasing the threshold value and minimizing erroneous object rejection with respect to an image-inspection process. The leftward movement of the graphical button corresponds to a decreased threshold value and thereby a decreased-sensitivity towards said at least one object with respect to the image-inspection process. In an example, the left titled threshold leads to selection of more acceptances and less rejections.

The movement of the graphical button in 310 is also defined by a rightward movement for increasing the threshold value and minimizing erroneous object acceptance with respect to an image-inspection process. The rightward movement of the graphical button corresponds to an increased threshold value and thereby an increased sensitivity towards said at least one object with respect to the image-inspection process. In an example, the right tilted threshold leads to selection of more rejections and less acceptance.

Further, referring back FIG. 3A, a third portion 304-1 of GUI 204 indicates 'input images' and 'aligned objects in the images (or aligned images)' that are subject to further image inspection. The section 304-2 depicts an NG probability or "Not good probability" with respect to the aligned image as "0.4", as determined by the machine learning criteria within the system 202. Accordingly, based on the preset threshold of "50", the object is probable to be Ok and approved during the image-inspection process.

Another section 308 of the GUI 204 depicts the count of total input images or a total number of detected objects in images as have been aligned within the image frame, which in the current example is shown as 219. Based on the preset threshold of 50, it is determined that 109 objects have been certified as Ok (i.e. probable to be approved during image inspection) and 110 objects have been certified as "Not Good NG" and accordingly probable to be rejected.

Figure 4:
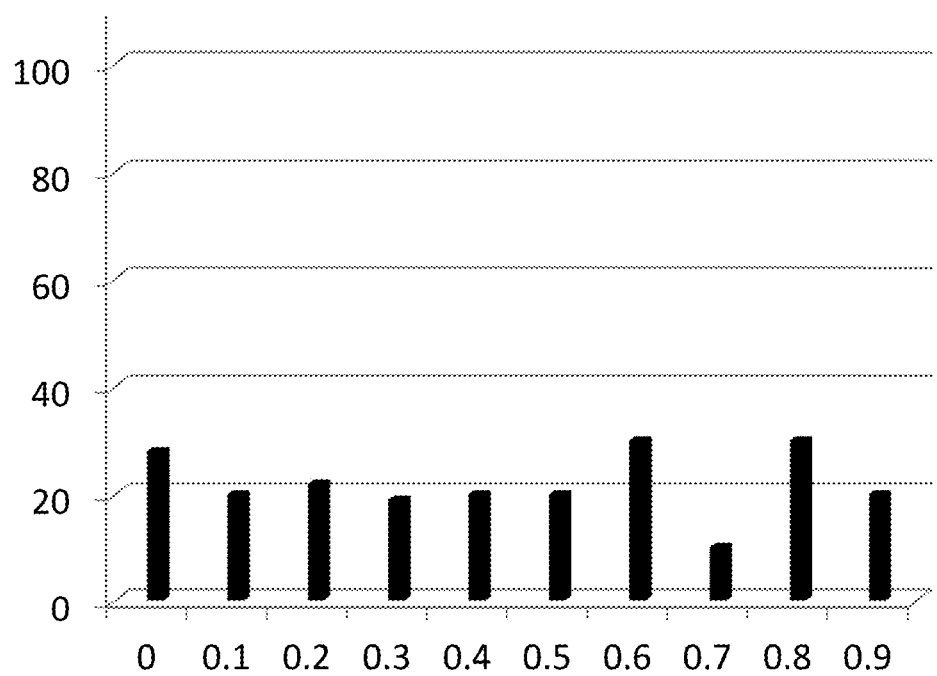
FIG. 4 illustrates a distribution of quality-indicia of objects for assisting image-inspection and quality-control, in accordance with another embodiment of the present disclosure.

FIG. 4 illustrates a distribution 302-1 of quality-indicia of objects to be inspected, in accordance with another embodiment of the present disclosure. The present distribution is a histogram of computed "Not good" (NG) probabilities (0 to 0.9) for various objects in the images as exhibited towards the image alignment system 202.

Figure 5:
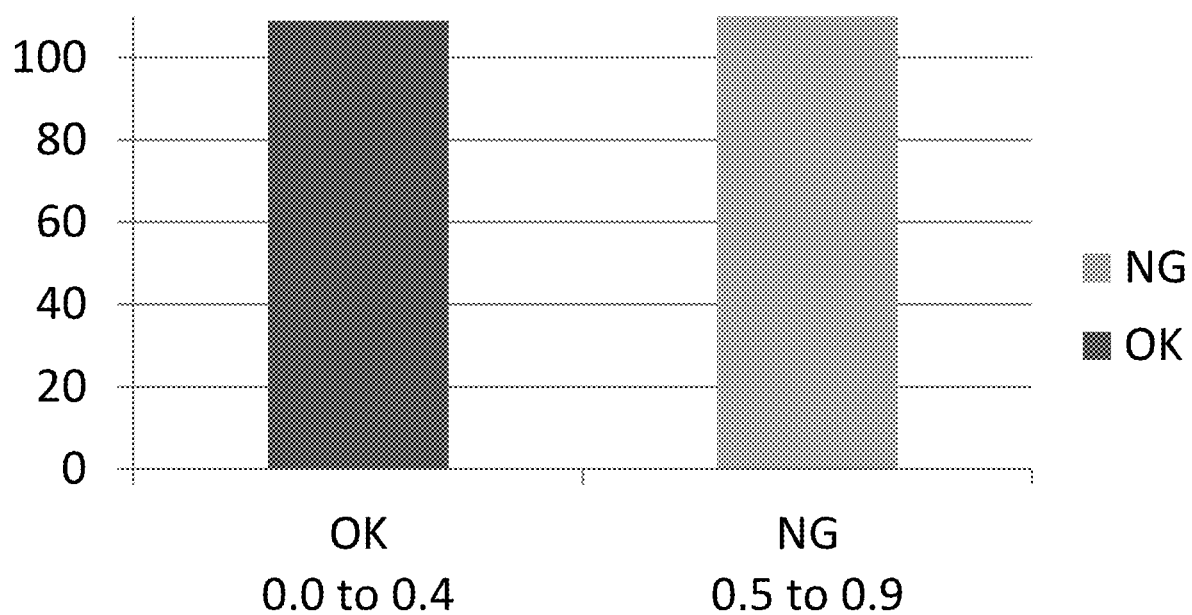
FIG. 5 illustrates a categorization of objects based on a preset threshold, in accordance with another embodiment of the present disclosure.

FIG. 5 illustrates a categorization of objects based on a preset threshold, in accordance with another embodiment of the present disclosure. Based on preset threshold of 50, it is held that objects corresponding to the NG probability range of 0 to 0.4 are expected to be approved during image inspection. Accordingly, the objects corresponding to the NG probability range of 0.5 to 0.9 are expected to be rejected during image inspection.

In an example, out of 219 objects whose images have been inputted and aligned, 109 are deemed OK and 110 are deemed NG.

Figure 6:
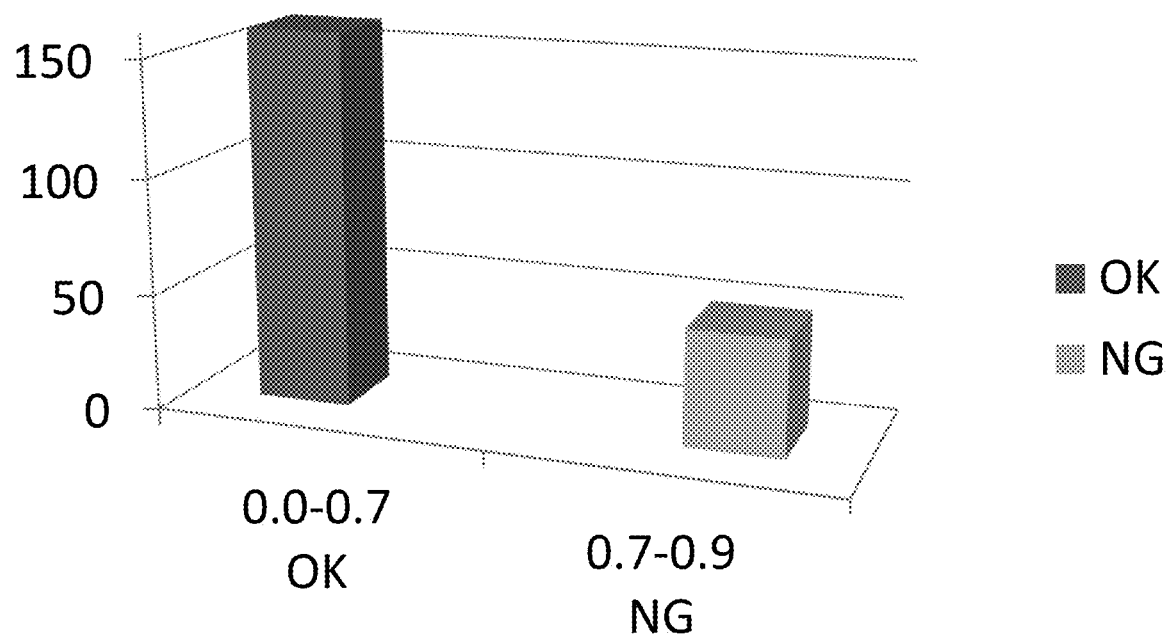
FIG. 6 illustrates another categorization of objects based on altered-threshold, in accordance with another embodiment of the present disclosure.

FIG. 6 illustrates another categorization of objects based on altered-threshold, in accordance with another embodiment of the present disclosure. More specifically, the preset threshold from 50 have been moved leftwards through the control in FIG. 3B and changed to 30. Based on now set threshold of 30, it is held that objects corresponding to the NG probability range of 0 to 0.7 are expected to be approved during image inspection. Accordingly, the objects corresponding to the NG probability range of 0.7 to 0.9 are expected to be rejected during image inspection. Based on the same and in an example, out of the 219 objects whose images have been inputted and aligned, 169 are deemed OK and 50 are deemed NG. The present setting of threshold to 30 corresponds to a lesser sensitivity setting.

Figure 7:
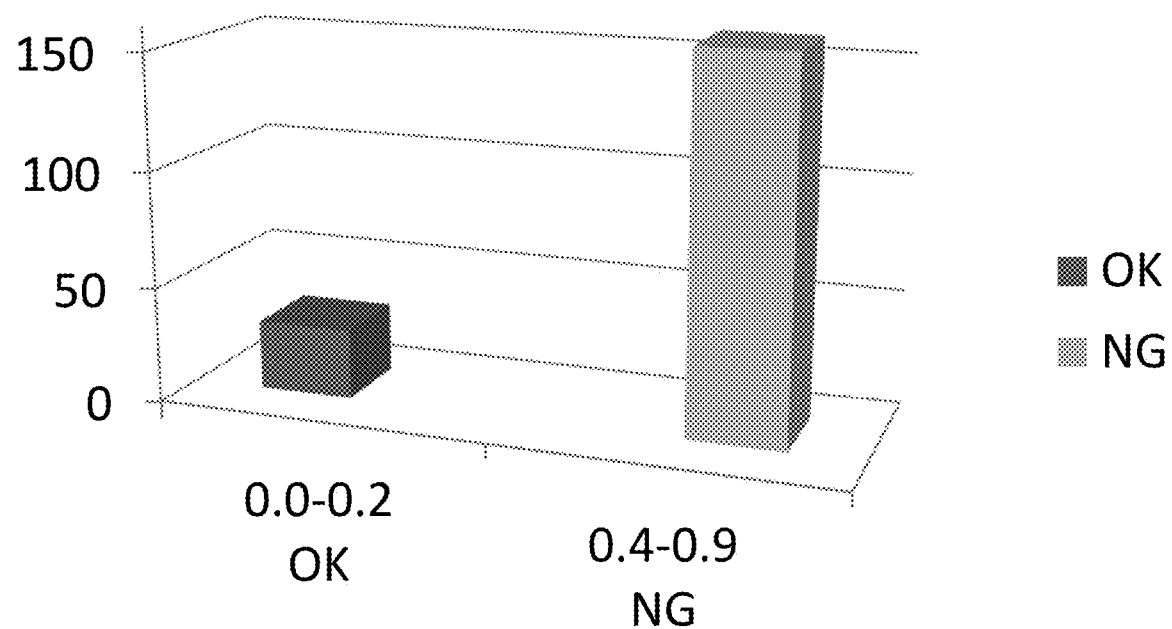
FIG. 7 illustrates another categorization of objects based on yet another altered-threshold, in accordance with another embodiment of the present disclosure.

FIG. 7 illustrates another categorization of objects based on yet another altered-threshold, in accordance with another embodiment of the present disclosure. More specifically, the preset threshold from 50 have been moved rightwards through the control in FIG. 3B and changed to 80. Based on now set threshold of 80, it is held that objects corresponding to the NG probability range of 0 to 0.2 are expected to be approved during image inspection. Accordingly, the objects corresponding to the NG probability range of 0.2 to 0.9 are expected to be rejected during image inspection. Based on the same and in an example, out of the 219 objects whose images have been inputted and aligned, 30 are deemed OK and 179 are deemed NG. The present setting of threshold to 80 corresponds to a higher sensitivity setting.

Figure 8:
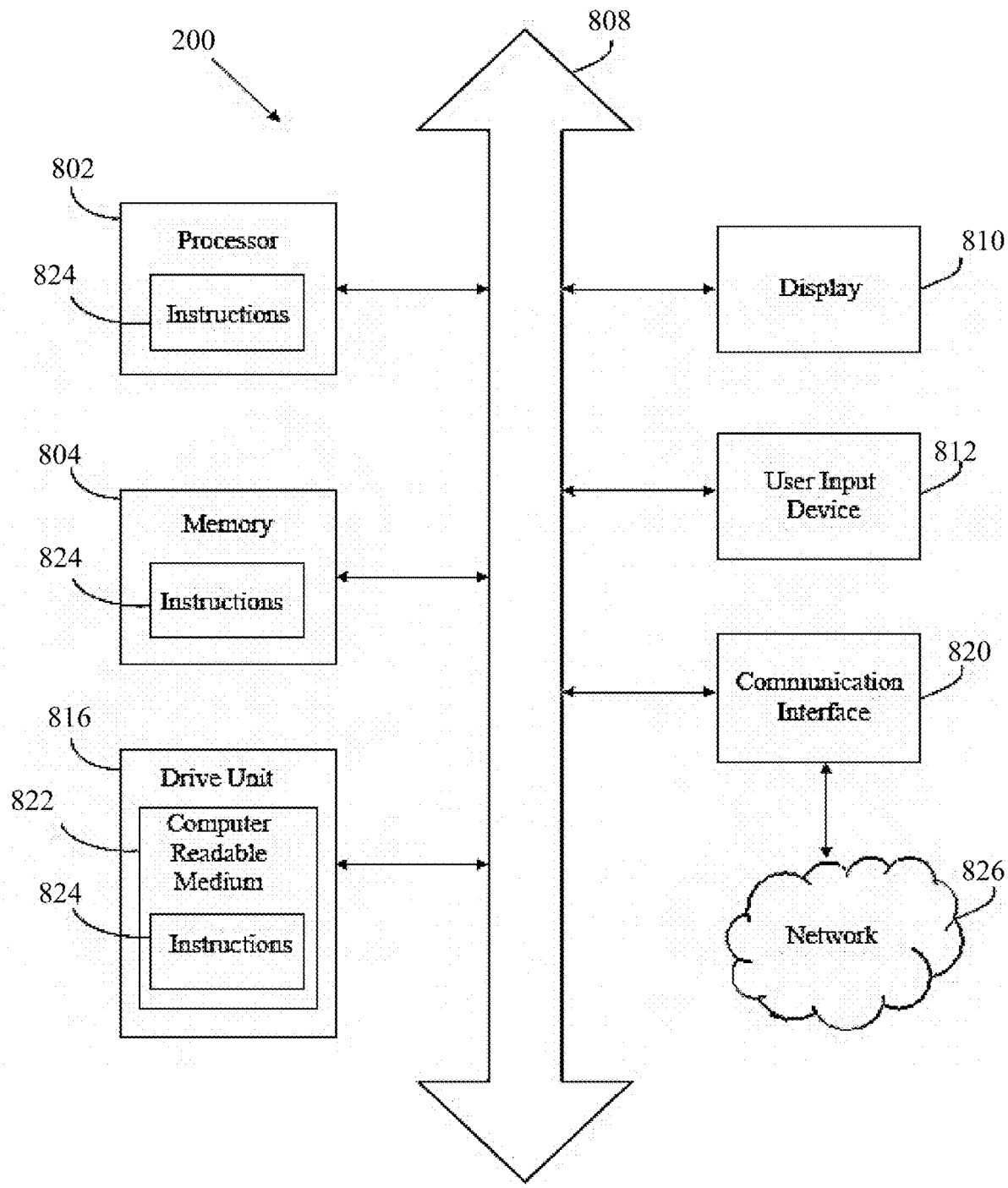
FIG. 8 illustrates an implementation of the system as illustrated in preceding figures in a computing environment, in accordance with another embodiment of the present disclosure.

FIG. 8 illustrates an implementation of the system 200 as illustrated in FIG. 2 in a computing environment. The present figure essentially illustrates the hardware configuration of the system 200 in the form of a computer system 800 is shown. The computer system 800 can include a set of instructions that can be executed to cause the computer system 800 to perform any one or more of the methods disclosed. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802 (e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data The processor 802 may implement a software program, such as code generated manually (i.e., programmed).

The computer system 800 may include a memory 804, such as a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 804 includes a cache or random access memory for the processor 802. In alternative examples, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 800 may or may not further include a display unit 810, such as a liquid crystal display (LCD), an organic light emitting diode (OLED), a flat panel display, a solid state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 816.

Additionally, the computer system 800 may include an input device 812 configured to allow a user to interact with any of the components of system 800. The input device 812 may be a number pad, a keyboard, or a cursor control device, such as a mouse, or a joystick, touch screen display, remote control or any other device operative to interact with the computer system 800.

The computer system 800 may also include a disk or optical drive unit 816. The disk drive unit 816 may include a computer-readable medium 822 in which one or more sets of instructions 824, e.g. software, can be embedded. Further, the instructions 824 may embody one or more of the methods or logic as described. In a particular example, the instructions 824 may reside completely, or at least partially, within the memory 804 or within the processor 802 during execution by the computer system 800. The memory 804 and the processor 802 also may include computer-readable media as discussed above.

The present invention contemplates a computer-readable medium that includes instructions 824 or receives and executes instructions 824 responsive to a propagated signal so that a device connected to a network 826 can communicate voice, video, audio, images or any other data over the network 826. Further, the instructions 824 may be transmitted or received over the network 826 via a communication port or interface 820 or using a bus 808. The communication port or interface 820 may be a part of the processor 802 or may be a separate component. The communication port 820 may be created in software or may be a physical connection in hardware. The communication port 820 may be configured to connect with a network 826, external media, the display 810, or any other components in system 800 or combinations thereof. The connection with the network 826 may be a physical connection, such as a wired Ethernet connection or may be established wirelessly as discussed later. Likewise, the additional connections with other components of the system 800 may be physical connections or may be established wirelessly. The network 826 may alternatively be directly connected to the bus 808.

The network 826 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/EP based networking protocols.

In an alternative example, dedicated hardware implementations, such as application specific integrated circuits, programmable logic arrays and other hardware devices, can be constructed to implement various parts of the system 800.

The present subject matter by enabling a setting of the threshold for the probability enables setting up of the "sensitivity" for the selection of objects and accordingly contributes to an ease of quality-control. The present subject matter at least proposes usage of a combination of a histogram of probability 302 with a sensitivity/specificity setting in FIG. 3B to determine an optimal threshold and accordingly arrive at the same through dragging the GUI based control 310 in FIG. 3B.

In an example, the user may employ different "sensitivity" or thresholds for different customer. In an example, any threshold above 50 indicates a higher sensitivity and accordingly allows selection of only higher quality objects (e.g. automobile products) during image inspection. In other example, any threshold below 50 indicates a lower sensitivity and allows selection of objects for cheaper non-critical devices.

Moreover, based on the histograms 302, the user is able to quickly judge which threshold is most optimal in reference to preset threshold. At the same time, finding the optimal threshold can be also done automatically (for example, using Otsu's method).

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

What is claimed is:

1. A graphical user interface (GUI) for enabling image inspection on an electronic device equipped with an input-device and a display-screen, comprising:
   a first area of display-screen configured to display a distribution of a quality-indicia of at least one object in each a plurality of images to be inspected; and
   a second-area of display-screen configured to display a user-control to adjust a threshold. value with reespect to an acceptance of said at least one object in the plurality of images to be inspected, said threshold value being configured to be determined manually or automatically, wherein the distribution is a histogram based representation of the quality-indicia pertaining to each of a plurality of images, and wherein the probability of acceptance represents the probability of the said at least one obi ect within image being satisfactory or unsatisfactory.

2. The GUI as claimed in claim 1, wherein the quality-indicia corresponds to a probability of the acceptance and/or rejection of said at least one object within the plurality of images.

3. The GUI as claimed in claim 1, wherein the quality-indicia is computed by a machine-learning model based on the images to be inspected.

4. The GUI as claimed in claim 1, wherein the control is a linea movable graphical button for enabling the user to adjust a threshold-value for acceptance of said at least one object within the plurality of images to be inspected.

5. The GUI as claimed in claim 4, wherein a user-selected position of movable-button renders the threshold value on the scale of 100.

6. A graphical user interface (GUI) for enabling image inspection on an electronic device equipped with an input-device and a display-screen, comprising:
   a first area of display-screen configured to display a distribution of a quality-indicia of at least one object in each a plurality of images to be inspected; and
   a second-area of display-screen configured to display a user-control to adjust a threshold value with respect to an acceptance of said at least one object in the plurality of images to be inspected, said threshold value being configured to be determined manually or automatically,
   wherein the user-control is a linearly movable graphical button for enabling the user to adjust the threshold-value for acceptance of said at least one object within the plurality of images to be inspected, and
   wherein the movement of the graphical button is defined by at least one of:
      a movement in a first direction for decreasing the threshold value and minimizing erroneous object rejection with respect to an image-inspection process; and
      a movement in a second direction opposite the first direction for increasing the threshold value and minimizing erroneous object acceptance with respect to an image-inspection process.

7. The GUI as claimed in claim 6, wherein the rightward movement of the graphical button corresponds to an increased threshold value and thereby an increased sensitivity towards said at least one object with respect to the image-inspection process.

8. The GUI as claimed in claim 6, wherein the leftward movement of the graphical button corresponds to a decreased threshold value and thereby a decreased-sensitiviy towards said at least one object with respect to the image-inspection process.

9. A method implemented in a computing-device with a display screen for image inspection, said method comprising:
   in a first area of the display screen, displaying a distribution of a quality-indicia of at least one object in each of a plurality of images to be inspected;
   in a second area of the display screen, displaying a user-control to adjust a threshold value with respect to an acceptance of at least one object in said plurality of images to be inspected, said threshold value configured to be determined manually or automatically;

determining an updated threshold value based on a user-operation performed over the user-control for adjusting the threshold value;

determining a quality-indicia of at least one object in each the plurality of images; and indicating acceptable objects in respect of an image inspection procedure based on the updated threshold value and the determined quality-indicia, wherein the adjusting of the threshold value is defined by:

a decrement of the threshold value for minimizing erroneous object-rejection during the image inspection procedure, or an increment of the threshold value for minimizing erroneous object-acceptance during the image inspection procedure.

10. The method as claimed in claim 9, wherein the adjusting of the threshold value is defined by a decrement of the threshold value for a deceased sensitivity towards the object during the image inspection procedure.

11. The method as claimed in claim 9, wherein the adjusting of the threshold value is defined by an increment of the threshold value for an increased sensitivity towards the object during the image inspection procedure.

\* \* \* \* \*